(12) United States Patent
August

(10) Patent No.: US 7,229,048 B1
(45) Date of Patent: Jun. 12, 2007

(54) AERODYNAMIC CONTROL OF A HYPERSONIC ENTRY VEHICLE

(75) Inventor: Henry August, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/290,975

(22) Filed: Nov. 30, 2005

(51) Int. Cl.
B64G 1/00 (2006.01)
(52) U.S. Cl. ............... 244/158.7; 244/159.3; 244/159.1; 244/213; 244/49; 244/3.27
(58) Field of Classification Search ............ 244/158.7, 244/159.3, 159.8, 159.1, 213, 49, 3.27
See application file for complete search history.

(56) References Cited

U.S. PATENT DOCUMENTS 3,204,892 A * 9/1965 Powell ...................... 244/218
3,276,722 A * 10/1966 Eggers, Jr. et al. ...... 244/159.3
5,398,888 A * 3/1995 Gerhardt ................... 244/45 A
5,873,549 A * 2/1999 Lane et al. ............... 244/158.9
6,502,785 B1 * 1/2003 Teter et al. ................ 244/3.22

* cited by examiner

Primary Examiner—J. Woodrow Eldred
(74) Attorney, Agent, or Firm—Harness, Dickey & Pierce, P.L.C.

(57) ABSTRACT

A hypersonic vehicle having in one or more embodiments a control surface that is movable to a deployed position. The control surface is movable in a pivotal manner that establishes a gap between the leading edge of the control surface and the outer surface of the vehicle to provide a flow path. The gap allows a boundary layer along the outer surface of the vehicle to pass through the flow path with out separation from the outer surface, to further improve the effectiveness of the control surface.

20 Claims, 3 Drawing Sheets

AERODYNAMIC CONTROL OF A HYPERSONIC ENTRY VEHICLE

FIELD OF THE INVENTION

The present invention relates to atmospheric entry vehicles, and more specifically to aerodynamic control of a capsule.

BACKGROUND OF THE INVENTION

In the pursuit of space exploration, scientists have recently contemplated planetary landing missions to planets such as Mars. A vehicle for such a mission would require aerodynamic control during its atmospheric entry at hypersonic speeds. During the vehicle's entry into the atmosphere, the vehicle's flight needs to be controlled so that the vehicle can be steered to sites where safe landings can be executed.

SUMMARY OF THE INVENTION

The various embodiments in the present specification relate to the aerodynamic control, steering and aerobraking of an atmospheric entry vehicle, which comprises a body having a generally tapered shape, and one or more moveable members. In one embodiment, the vehicle includes a body having a generally conical outer surface shape, and one or more control surfaces positioned on the body's outer surface. Each of the one or more control surfaces are moveable between a stowed position in which the control surface is substantially flush with the body's outer surface, and at least one deployed position in which the control surface is deflected at an angle from the body surface. In the deployed position, the control surface establishes a gap between the outer surface of the body and the leading edge of the control surface, through which a boundary layer flow along the body's outer surface passes through. The gap has a height which allows a portion of the boundary layer along the body's outer surface to pass through, such that substantially no separation of the boundary layer along the body's outer surface occurs, and the boundary layer along the control surface attaches at a point substantially near the leading edge of the control surface.

In one or more embodiments, the vehicle includes an actuator structure that is configured to move the control surface to one or more positions of varying deflection angle relative to the outer surface of the body for steering the vehicle. A control system is also included for controlling the actuator structure for each control surface, for controlling the deployment of one or more control surfaces to steer the vehicle.

A method for controlling an atmospheric entry vehicle is also provided. The method includes providing an aerodynamically shaped body portion for the vehicle, securing at least one control surface to the body portion, and controllably moving the control surface from either a stowed position, in which the control surface has no affect on the vehicle, to a deployed position in which the control surface projects outwardly from the body portion to assist in steering the vehicle. The process of controllably moving the control surface to the deployed position causes a gap to be formed between a leading edge of the control surface and an adjacent surface of the body portion, wherein the gap enables a boundary layer along the body portion to pass therethrough and thus avoid separation of the boundary layer as the control surface is deployed.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION

Figure 1:
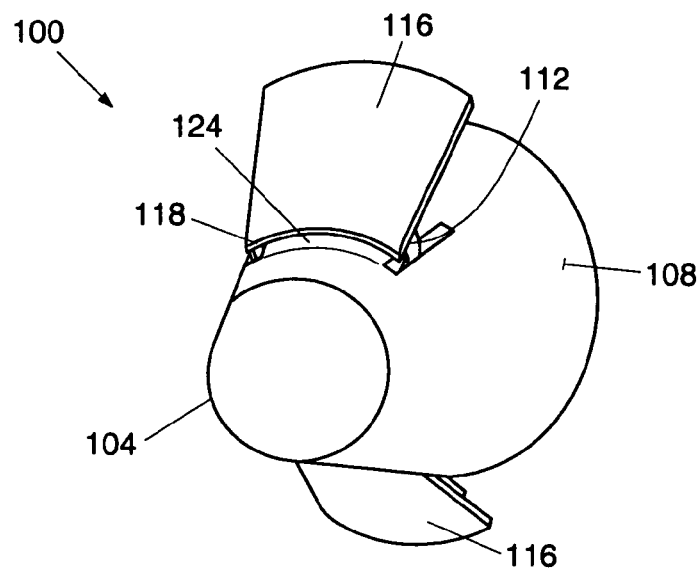
FIG. 1 is a perspective view of an atmospheric entry vehicle in accordance with one embodiment of the present invention.

The following description of the various specific embodiments is merely exemplary in nature and is in no way intended to limit the present disclosure, its application, or uses.

According to various aspects of the invention, there are provided specific embodiments of an atmospheric entry vehicle having one or more control surfaces that provide improved effectiveness for steering the vehicle as it experiences flight at hypersonic speeds. One embodiment of an atmospheric entry vehicle adapted to travel through a fluid medium is generally shown as 100 in FIG. 1. The atmospheric entry vehicle 100 comprises a body 104 having an outer surface 108, and at least one moveable member 112 coupled to the body 104. A control surface 116 associated with the movable member 112 is movable relative to the vehicle 100 to provide for direction control of the vehicle. It should be noted that the control surface 116 may comprise a separate surface component that is attached to the movable member 112, or alternatively, the control surface 116 associated with the moveable member 112 may be integrally formed with the moveable member 112. In the first embodiment, the control surface 116 generally comprises a trailing edge control surface or flap that conforms to the shape of the outer surface 108 of the vehicle 100. The control surface 116 and movable member 112 are adapted to be variably deployed into the orientation shown in FIG. 1, to generate a moment for maneuvering the atmospheric entry vehicle during hypersonic speeds or lesser speeds, as well as for aerobraking.

Referring to FIG. 1, the outer body surface 108 has a generally tapered shaped. The atmospheric entry vehicle 100 can encompass a variety of shapes or contours, and may include a conical shape such as that shown in FIG. 1. The moveable member 112 and control surface 116 are pivotally coupled to the vehicle 100 in a manner such that outward movement of the control surface 116 is permitted. The outward deploying movement of the control surface 116 establishes a deflection angle relative to the vehicle 100 from the juncture point where the leading edge 118 of the control surface 116 adjoins the outer surface 108, to the trailing edge of the control surface. When the moveable member 112 is in a first stowed position, the control surface 116 is generally flush with a portion of the vehicle's outer surface 108. At hypersonic speed, a first local boundary layer 110 is developed over the juncture 120 (shown in FIG. 2) where the leading edge 118 of the control surface 116 adjoins the outer surface 108 of the vehicle 100. In at least one deployed position, the control surface 116 also develops a second local boundary layer 140 along a portion of its outer surface 108.

In FIG. 1, the vehicle 100 comprises at least two deployable control surfaces 116, but may include four control surfaces or any other suitable number of control surfaces 116 to provide for steering. At least two of the control surfaces 116 are generally opposite each other, such that the opposing control surfaces 116 provide for aerobraking when simultaneously deployed. When the moveable member 112 is deployed to extend away from the outer surface 108 of the vehicle 100 (at an angle δ relative to the surface of the vehicle), the fluid flow acting on the control surface 116 creates a control force 126 that generates a moment 128 about the vehicle's center of gravity for directing the vehicle 100 in a predetermined direction. The deploying of the control surface 116 into the hypersonic flow along a Newtonian line-of-sight direction causes this local control force and associated moment about the vehicle's 100 center of gravity, the magnitude of which increases as the deflection angle of the control surface 116 increases. The arrangement of two or more variably deployable control surfaces 116 allows the control surfaces 116 to generate variable moments about the vehicle's 100 center of gravity for controlling maneuverability of the atmospheric entry vehicle 100. The design of the control surfaces 116 establishes a gap 124 through which the local boundary layer flow 110 passes through to further provide for improved effectiveness of the control surface 116.

Figure 2:
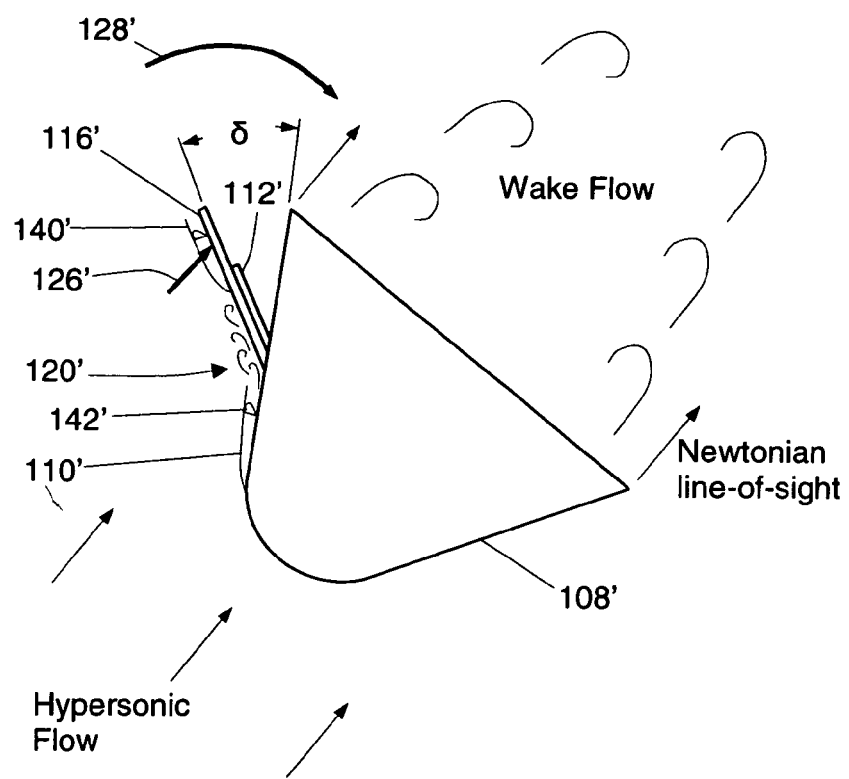
FIG. 2 is a side elevation view of an atmospheric entry vehicle having one of its control surfaces deflected.

Referring to FIG. 2, an atmospheric entry vehicle is shown with a control surface 116' which does not include a gap. When the control surface 116' is deployed, the local boundary layer 110' over the body surface 108' at juncture 120' shown in FIG. 2 is likely to separate and reattach near the mid-chord of the control surface 116'. At hypersonic speed, a local shock may be generated at the juncture 120' when deploying the control surface 116'. Due to the imposed adverse pressure gradient 142', the approaching boundary layer 140' may separate and reattach on the control surface 116' near mid-chord where the heat load experienced by the control surface 116' is further aggravated. The separation of the boundary layer 140' from the control surface 116' can degrade the effectiveness of the control surface 116'. The effects of the local shock and separation of the boundary layer 140' result in a higher heat load and disruption of fluid flow across the control surface 116'.

Figure 3:
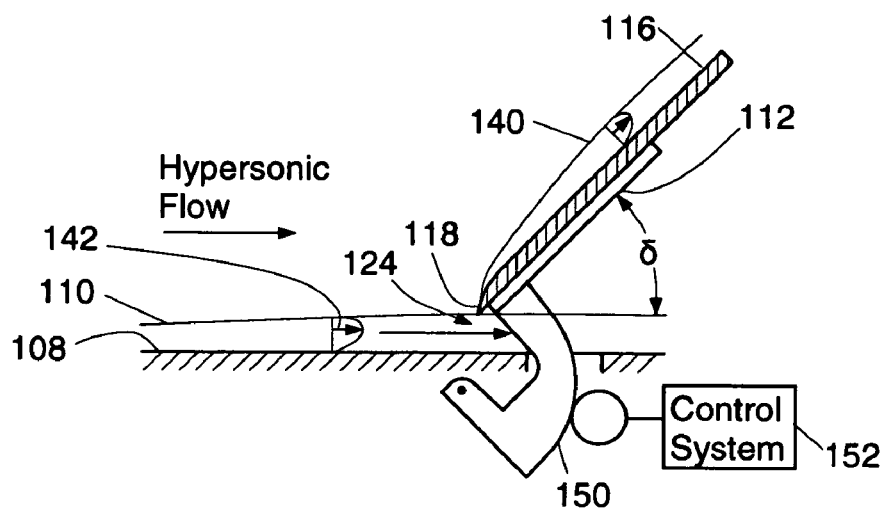
FIG. 3 is an illustration of the hypersonic flow along the surface of a first embodiment of an atmospheric entry vehicle and control surface.

In the first embodiment shown in FIG. 3, movement of the movable member 112 and the associated control surface 116 outwardly towards a deployed position establishes the gap 124 between the body's outer surface 108 and the leading edge 118 of the control surface 116, which gap forms a fluid flow path. The gap 124 generally comprises a curved space between the leading edge 118 of the control surface 116 (which generally conforms to the conical shape of the vehicle body), and the conical outer surface 108 of the vehicle. It should be noted that at least a portion of the vehicle may comprise a generally conical outer surface. In other embodiments, some portions of the vehicle may comprise areas that have much less curvature in the contour of the outer surface, and may even have generally flat portions. In such cases, the gap may comprise a generally rectangular space between the leading edge of the control surface and the generally parallel outer surface of the vehicle.

A portion of the boundary layer flow 110 along the vehicle body's outer surface 108 passes through the gap 124. This substantially alleviates the influence of a local shock at the body/control juncture 120 to inhibit separation of boundary layer 110 from the outer surface 108, and to permit attachment of the boundary layer 140 at or near the leading edge 118 of the control surface 116. The atmospheric entry vehicle 100 may further comprise an actuator structure 150 coupled to the control surface 116 for deploying each individual control surface 116. A control system 152 preferably controls one or more actuator structures 150 to independently variably deploy the one or more control surfaces 116 at various angles relative to the outer surface 108 of the vehicle 100 to provide for steering.

Figure 4:
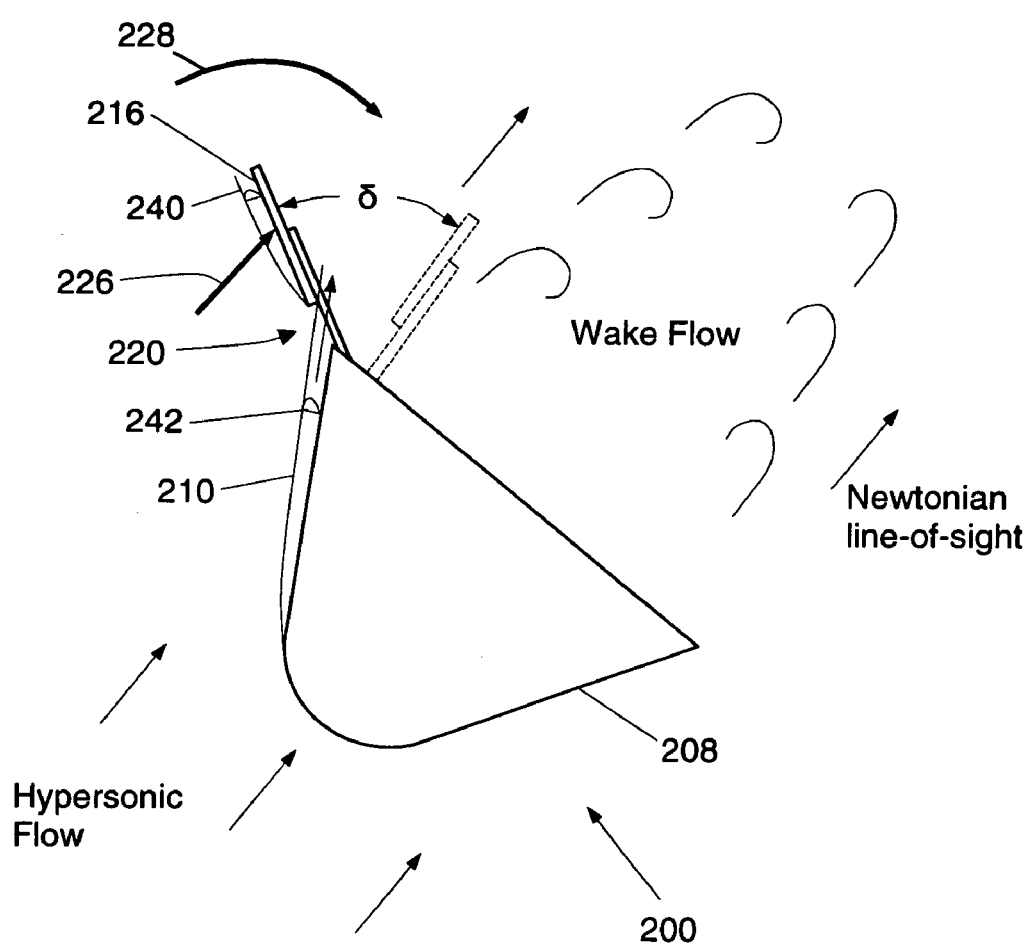
FIG. 4 is a side elevation view of a second embodiment of an atmospheric entry vehicle having a deflected control surface.

Referring to FIG. 4, a second embodiment of an atmospheric entry vehicle 200 is shown that comprises an outer body surface 208 having a generally tapered shape. At least one moveable member 212 and at least one control surface 216 is pivotally coupled to the vehicle 200 in a manner such that an outward deploying movement of the control surface 216 is permitted. The outward movement of the control surface 216 establishes a deflection angle relative to the vehicle 200. When the moveable member 212 is in a first stowed position, the control surface 216 is in a shielded position behind the vehicle 200 (from a Newtonian line-of-sight). At hypersonic speed, a local boundary layer 210 is established over the outer surface 208 of the vehicle 200. When the moveable member 212 is deployed (at an angle δ relative to the stowed position of the control surface 216), the fluid flow acting on the control surface 216 creates a control force 226 that generates a moment 228 about the vehicle's center of gravity for directing the vehicle 200 in a predetermined direction. In at least one deployed position, the control surface 216 also develops a local boundary layer 240 along the control surface 216.

In the second embodiment, movement of the movable member 212 and associated control surface 216 outwardly towards a deflected position establishes a gap between the body's outer surface 208 and a leading edge 218 of the control surface 216. In at least one deployed position of the moveable member 212, a space or gap 224 is provided between the leading edge 218 of the control surface 216 and the outer body surface 208, which gap defines a fluid flow path8. The boundary layer flow 210 along the vehicle body's outer surface 208 passes through this gap 224. This substantially alleviates the influence of a local shock at the juncture 220 to inhibit separation of the boundary layer 210 from the outer surface 208, and to permit attachment of the boundary layer 240 at or near the leading edge 218 of the control surface 216.

Figure 5:
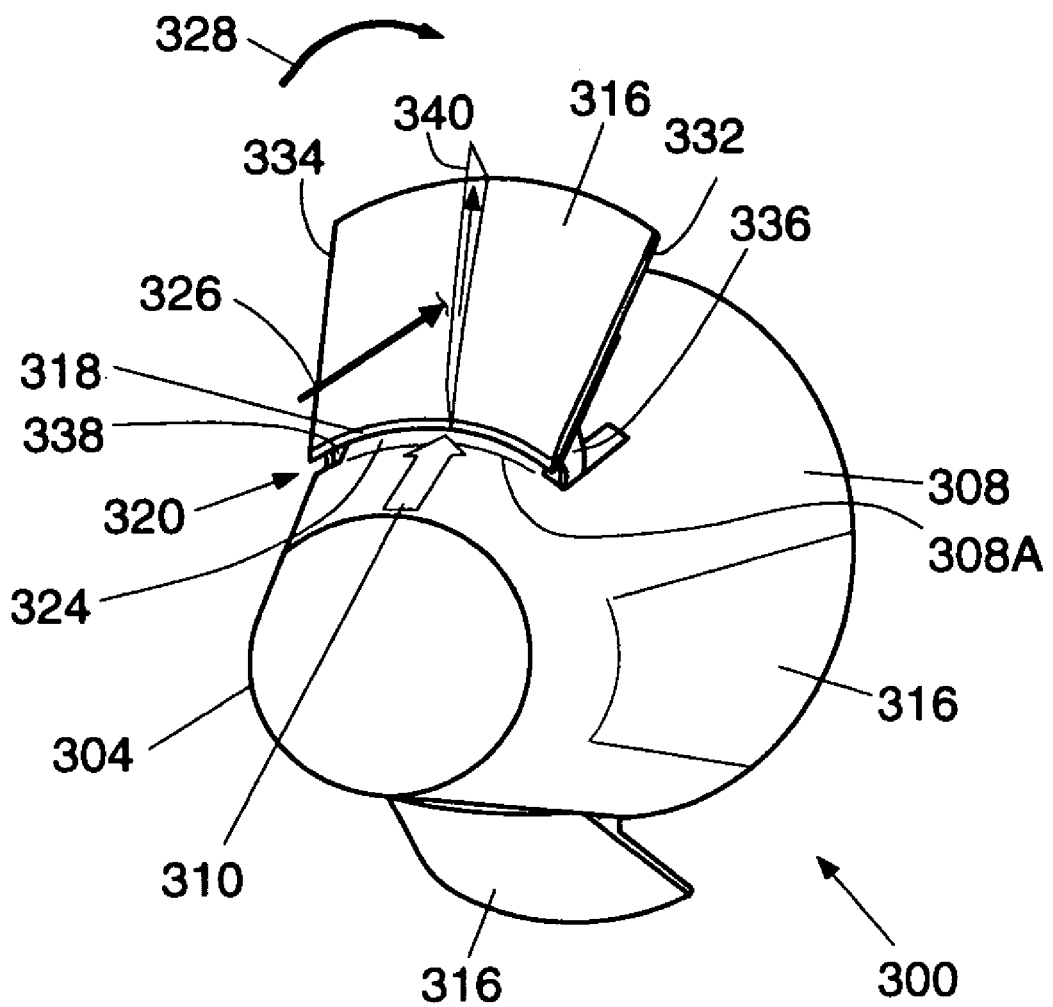
FIG. 5 is a perspective view of a third embodiment of the present invention.

In a third embodiment shown in FIG. 5, an aerodynamic body or capsule 300 is provided that has a generally conically shaped outer body surface 308. The aerodynamic capsule or body 300 comprises one or more control surfaces 316 circumferentially positioned along the body's outer surface 308. The one or more control surfaces 316 preferably include at least four control surfaces spaced around the vehicle's conical surface 308 in a cruciform pattern. The deployment of the control surface 316 into a hypersonic flow along a Newtonian line-of-sight direction causes a local control force 326 to be formed that generates a predetermined moment 328 about the body's center of gravity, the magnitude of which increases as the deflection angle of the control surface 316 increases. The arrangement of four control surfaces 316 allows adjacent deployed control surfaces 316 to generate variable moments in various selected directions about the body's center of gravity to control pitch and yaw attitude for controlling maneuverability of the capsule body 300. The design of the control surfaces 316 provides for improved control surface effectiveness during aerobraking and maneuvering phases to allow for fuel saving aerocapture techniques that enhance the longevity of capsule 300.

The one or more control surfaces 316 are moveable between a first stowed position in which the control surfaces 316 are positioned substantially flush with the body surface 308, and at least a second position in which the control surfaces 316 are deployed at an angle δ from the body surface 308. In the second position, the control surfaces 316 form a space between a leading edge 318 of the control surface 316 and the body surface 308 that defines a gap 324 through which a first boundary layer flow 310 along the body surface passes through. The one or more control surfaces 316 are pivotally coupled to the aerodynamic body 300 via arm portions 336 and 338. The aerodynamic capsule 300 further comprises a conventional independent actuator structure (not shown) for each control surface that is configured to move the control surface 316 to one or more positions of varying deployment angles relative to the outer surface 308 of the body. The one or more control surfaces 316 have first and second opposing edge portions 332 and 334 that are coupled to the first and second arm portions 336 and 338. The opposite ends of the arm portions 336 and 338 are pivotally coupled to the capsule 300 near edge 308A. Each independent actuator structure is preferably connected to a drive mechanism, and is operative to pivotally move its respective control surface 316 via the arm portions 336 and 338 to a deployed position relative to the capsule body's outer surface 308. The pivotal coupling permit the control surfaces 316 to be deployed in a manner such that each control surface 316 may pivot generally about a hinge line, but may alternatively move outwardly in a rotational manner that does involve a fixed pivot point. For example, the arm portions 336 and 338 may comprise a dog leg shape (as shown in FIG. 3) that allows the control surface 316 to be deployed to establish the gap 324 between the control surface 316 and the outer capsule surface 308. Thus, the deployment of the control surface 316 establishes a stand-off region between the leading edge 318 of the control surface 316 and the body's outer surface 308.

The actuator structure moves the control surfaces 316 to a position that is generally flush with the outer surface 308 of the body to close the gap 324. The actuator structure can also be configured to adjust the angle of deflection of the control surface 316, as well as the height of the gap 324. The height of gap 324 allows a portion of the boundary layer flow 310 along the outer surface 308 of the body 300 to pass through the gap 324 under the leading edge 318 of the control surface 316. The height of gap 324 inhibits the separation effects of the boundary layer 310 along the body's outer surface 308, such that the boundary layer remains substantially attached to the outer surface 308. The gap 324 is configured to substantially alleviate the influence of a local shock that may cause turbulence at the body/control juncture 320 such that the boundary layer 310 remains attached to the outer surface 308. In one preferred form, the gap height is preferably in the range of about 0.125 inch (3.175 mm) to about 1.0 inch (25.4 mm), and is more preferably in the range of about 0.250 (6.35 mm) to about 0.750 (19.05 mm). This substantially alleviates the influence of a local shock at the juncture 320 to inhibit separation of the boundary layer 310 from the outer surface 308, and to permit attachment of a second boundary layer 340 at or near the leading edge 318 of the control surface 316. The attachment of the second boundary layer near the leading edge enhances the effective area of the control surface 316 to further improve the maneuverability of the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An aerodynamic vehicle comprising:
a body having a portion with a generally conical outer surface shape;
one or more control surfaces positioned on the body's outer surface; and
one or more arm portions configured to couple a leading edge of one of the one or more control surfaces to the body;
each said control surface being moveable between a stowed position in which the control surface is substantially flush with the body's outer surface and the one or more arm portions are inside the body, and at least one deployed position in which a trailing edge of the control surface is separated from and deflected at an angle from the body's outer surface and the arm portions are extended at least partially to establish a gap between a portion of the outer surface of the body substantially parallel to the leading edge of the control surface and the leading edge of the control surface, to enable a first boundary layer flow along the body's outer surface to pass through.

2. The aerodynamic vehicle of claim 1, wherein the gap has a height for allowing a portion of the first boundary layer along the body's outer surface to pass through the gap such that substantially no separation of the first boundary layer along the body's outer surface occurs, and a second boundary layer along each said control surface attaches at a point substantially near the leading edge of each said control surface.

3. The aerodynamic body of claim 1, further comprising an actuator structure that is configured to move each said control surface to one or more positions of varying deflection angle relative to the outer surface of the body for steering the vehicle.

4. The aerodynamic vehicle of claim 2, wherein the actuator structure is configured to adjust the gap height between the body surface and the leading edge of each said control surface.

5. The aerodynamic vehicle of claim 1, wherein the gap allows a portion of the first boundary layer flow along the outer surface of the body to pass through the gap under the leading edge of the control surface so as to inhibit separation of the first boundary layer along the body's outer surface.

6. The aerodynamic vehicle of claim 1 wherein the gap is configured to substantially alleviate the influence of a local shock at the body/control surface juncture such that the first boundary layer along the body's outer surface remains attached.

7. The aerodynamic vehicle of claim 1 wherein the gap has an effective height for allowing a portion of the first boundary layer flow along the body's outer surface to pass through the gap without suffering a local shock, such that a second boundary layer along the control surface attaches itself substantially near the leading edge of the control surface.

8. An atmospheric entry vehicle adapted to travel through a fluid medium comprising:
   a body having an outer surface;
   at least one moveable member, each coupled to the body at a leading edge of the member by one or more arm portions, where in one position of one of the at least one moveable member a gap is provided by the one or more arm portions between the leading edge of said moveable member and a portion of said outer body surface substantially parallel to the leading edge that defines a fluid flow path; and
   a control surface associated with the at least one moveable member that is adapted to direct the atmospheric entry vehicle in a predetermined direction.

9. The atmospheric entry vehicle of claim 8, wherein the gap between the body surface and the leading edge of the control surface defines a flow path through which a first boundary layer flow along the body surface passes, such that the gap substantially alleviates the influence of a local shock at the body/control surface juncture to permit a boundary layer along the control surface to attach near the leading edge of the control surface.

10. The atmospheric entry vehicle of claim 9, wherein the gap allows a portion of the first boundary layer flow along the outer surface of the body to pass through the gap under the leading edge of the control surface so as to substantially alleviate separation of the first boundary layer along the body's outer surface.

11. The atmospheric entry vehicle of claim 10, wherein the first boundary layer flow propagates through the gap between the body and the leading edge of the control surface, such that substantially no separation of the first boundary layer flow along the body surface results.

12. The atmospheric entry vehicle of claim 8, wherein the body has a portion having a generally conical surface, and the at least one control surface is conformal in shape to the generally conical body surface.

13. The atmospheric entry vehicle of claim 12, wherein the at least one control surface comprises four control surfaces arranged in a cruciform pattern around the body's outer surface.

14. The atmospheric entry vehicle of claim 13 wherein the arrangement of four control surfaces allows adjacent deflected control surfaces to generate variable moments about the vehicle's center of gravity to control pitch and yaw attitude for controlling maneuverability of the atmospheric entry vehicle.

15. The atmospheric entry vehicle of claim 8 wherein the gap has an effective height that allows at least a portion of a first boundary layer along the body's outer surface to pass through the gap such that the first boundary layer remains substantially attached to the body's outer surface of the vehicle.

16. The atmospheric entry vehicle of claim 15 wherein the gap alleviates turbulence caused separation of the first boundary layer from the body, to enable attachment of the second boundary layer at or near the leading edge of the control surface.

17. The atmospheric entry vehicle of claim 16 wherein the attachment of the second boundary layer near the leading edge of the control surface enhances the effective area of the control surface to further improve the maneuverability of the vehicle.

18. The atmospheric entry vehicle of claim 15 wherein the effective height is in the range of about 0.125 inch to about 1.0 inch.

19. A method for controlling flight of an aerodynamic vehicle entering an atmosphere at hypersonic speeds, comprising:
   securing at least one control surface to an aerodynamically shaped body portion for the vehicle; and
   controllably moving the control surface from a stowed position in which one or more arm portions coupling the control surface to the body portion are enclosed in the body portion, to a deployed position in which the control surface projects outwardly as extended by the one or more arm portions extending from the body portion to assist in steering the vehicle and to cause a gap to be formed between a leading edge of the control surface and an adjacent surface of the body portion substantially parallel to the leading edge, the gap enabling a first boundary layer along the body portion to pass therethrough and thus avoid separation of the first boundary layer as the control surface is deployed.

20. The method of claim 19, further comprising:
   providing a plurality of control surfaces secured to the body portion and spaced apart around the body portion;
   controllably deploying the control surfaces in independent fashion to steer the vehicle.

* * * * *